US010122628B2

(12) United States Patent
Cariou et al.

(10) Patent No.: US 10,122,628 B2
(45) Date of Patent: Nov. 6, 2018

(54) STATION (STA), ACCESS POINT (AP) AND METHOD FOR RATE ADAPTATION

(71) Applicant: Intel IP Corporation, Santa Clara, CA (US)

(72) Inventors: Laurent Cariou, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 218 days.

(21) Appl. No.: 15/280,419

(22) Filed: Sep. 29, 2016

(65) Prior Publication Data

US 2017/0331734 A1    Nov. 16, 2017

Related U.S. Application Data

(60) Provisional application No. 62/333,951, filed on May 10, 2016.

(51) Int. Cl.
| | | |
|---|---|---|
| *H04L 12/741* | (2013.01) |
| *H04L 29/06* | (2006.01) |
| *H04W 84/12* | (2009.01) |
| *H04W 88/02* | (2009.01) |
| *H04W 88/08* | (2009.01) |

(52) U.S. Cl.
CPC ............. *H04L 45/74* (2013.01); *H04L 69/22* (2013.01); *H04W 84/12* (2013.01); *H04W 88/02* (2013.01); *H04W 88/08* (2013.01)

(58) Field of Classification Search
CPC ........ H04L 45/74; H04L 69/22; H04W 88/08; H04W 88/02; H04W 84/12
See application file for complete search history.

(56) References Cited

U.S. PATENT DOCUMENTS

| 8,265,564 | B2 * | 9/2012 | Lee | H04L 1/06 370/242 |
| 9,883,522 | B2 * | 1/2018 | Liu | H04W 72/10 |
| 9,967,061 | B2 * | 5/2018 | Ryu | H04L 1/1809 |
| 2011/0194644 | A1 * | 8/2011 | Liu | H04L 5/0023 375/295 |
| 2013/0294397 | A1 * | 11/2013 | Lee | H04B 7/063 370/329 |
| 2014/0254424 | A1 * | 9/2014 | Gao | H04L 1/0003 370/254 |

(Continued)

*Primary Examiner* — Redentor Pasia
(74) *Attorney, Agent, or Firm* — Schwegman Lundberg & Woessner, P.A.

(57) ABSTRACT

Embodiments of a station (STA), access point (AP) and method for rate adaption are generally described herein. The STA may receive a medium access control protocol data unit (MPDU) encoded in accordance with a first modulation and coding scheme (MCS). The STA may detect bit errors of the MPDU based on a comparison between the received MPDU and the decoded MPDU. The STA may determine an MCS reception margin parameter based at least partly on a comparison between a number of detected bit errors and a predetermined threshold of bit errors. The STA may transmit a block acknowledgement (BA) frame that includes the MCS reception margin parameter. The MCS reception margin parameter may enable a rate adaptation, from the first MCS to a second MCS for a subsequent MPDU for the STA.

26 Claims, 7 Drawing Sheets

(56) References Cited

U.S. PATENT DOCUMENTS

| | | | | |
|---|---|---|---|---|
| 2015/0003235 A1* | 1/2015 | Cho | ............... | H04W 28/06 |
| | | | | 370/229 |
| 2015/0319782 A1* | 11/2015 | Chu | ............... | H04W 74/08 |
| | | | | 370/336 |
| 2016/0142176 A1* | 5/2016 | Gao | ............... | H04L 1/1621 |
| | | | | 370/252 |
| 2016/0380727 A1* | 12/2016 | Ryu | ............... | H04L 1/18 |
| | | | | 370/245 |
| 2017/0257862 A1* | 9/2017 | Xue | ............ | H04W 72/0446 |
| 2017/0289844 A1* | 10/2017 | Son | ............ | H04W 28/06 |
| 2018/0084570 A1* | 3/2018 | Ding | ............ | H04L 1/1628 |

* cited by examiner

STATION (STA), ACCESS POINT (AP) AND METHOD FOR RATE ADAPTATION

PRIORITY CLAIM

This application claims priority under 35 USC 119(e) to U.S. Provisional Patent Application Ser. No. 62/333,951, filed May 10, 2016 [reference number P99076Z (9884.020PRV)] which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi communications. Some embodiments relate to rate adaptation, including adaptation of modulation and coding schemes (MCSs).

BACKGROUND

Wireless communications have been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
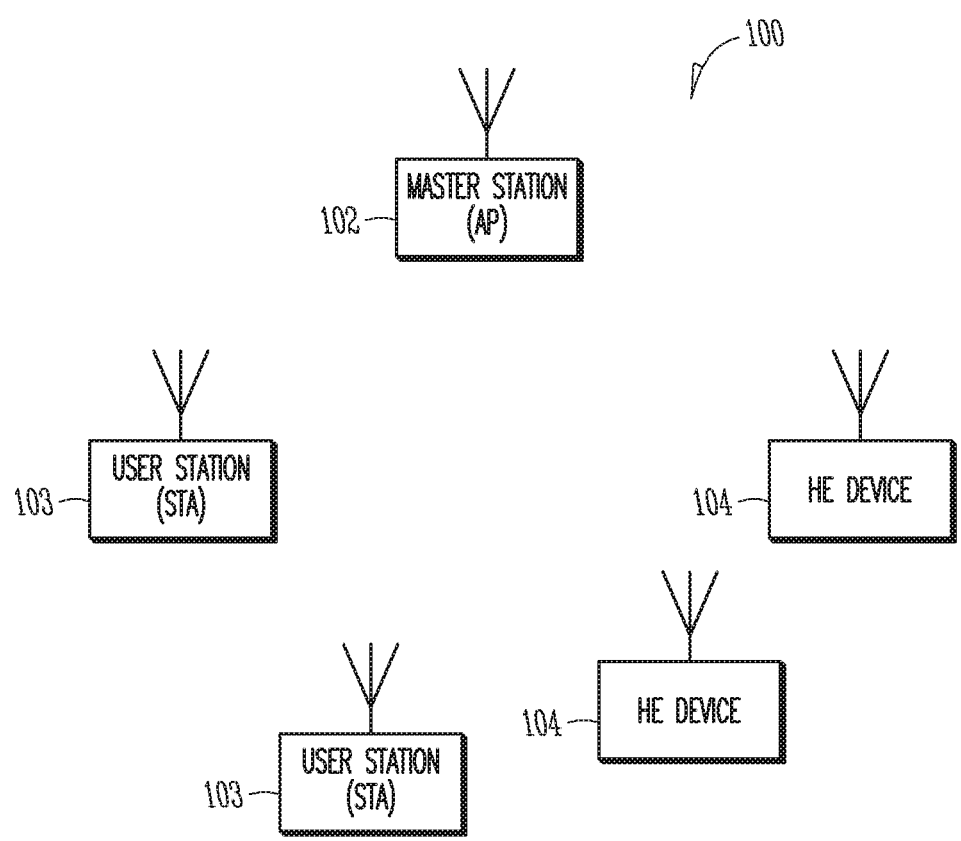
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support HE devices in some cases, non HE devices in some cases, and a combination of HE devices and non HE devices in some cases. Accordingly, it is understood that although techniques described herein may refer to either a non HE device or to an HE device, such techniques may be applicable to both non HE devices and HE devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HE devices 104. In some embodiments, the AP 102 may transmit a trigger frame (TF) to one or more STAs 103 to indicate information about downlink frames and/or uplink frames to be exchanged between the AP 102 and the STA 103. These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HE device 104 and/or other device may be configurable to operate as a master station. Accordingly, in such embodiments, operations that may be performed by the AP 102 as described herein may be performed by the STA 103, HE device 104 and/or other device that is configurable to operate as the master station.

In some embodiments, one or more of the STAs 103 may be legacy stations. These embodiments are not limiting, however, as the STAs 103 may be configured to operate as HE devices 104 or may support HE operation in some embodiments. The master station 102 may be arranged to communicate with the STAs 103 and/or the HE stations 104 in accordance with one or more of the IEEE 802.11 standards, including 802.11ax and/or others. In accordance with some HE embodiments, an access point (AP) may operate as the master station 102 and may be arranged to contend for a wireless medium (e.g., during a contention period) to receive exclusive control of the medium for an HE control period (i.e., a transmission opportunity (TXOP)). The master station 102 may, for example, transmit a master-sync or control transmission at the beginning of the HE control period to indicate, among other things, which HE stations 104 are scheduled for communication during the HE control period. During the HE control period, the scheduled HE stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HE control period, the master station 102 may communicate with HE stations 104 using one or more HE PPDUs. During the HE control period, STAs 103 not operating as HE devices may refrain from communicating in some cases. In some embodiments, the master-sync transmission may be referred to as a control and schedule transmission.

In some embodiments, the multiple-access technique used during the HE control period may be a scheduled orthogonal frequency-division multiple access (OFDMA) technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HE control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HE stations 104 outside the HE control period in accordance with legacy IEEE 802.11 communication techniques, although this is not a requirement.

In some embodiments, the HE communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an HE communication may be configured for transmitting a number of spatial streams.

In some embodiments, high-efficiency (HE) wireless techniques may be used, although the scope of embodiments is not limited in this respect. As an example, techniques included in 802.11ax standards and/or other standards may be used. In accordance with some embodiments, a master station 102 and/or HE stations 104 may generate an HE packet in accordance with a short preamble format or a long preamble format. The HE packet may comprise a legacy signal field (L-SIG) followed by one or more HE signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
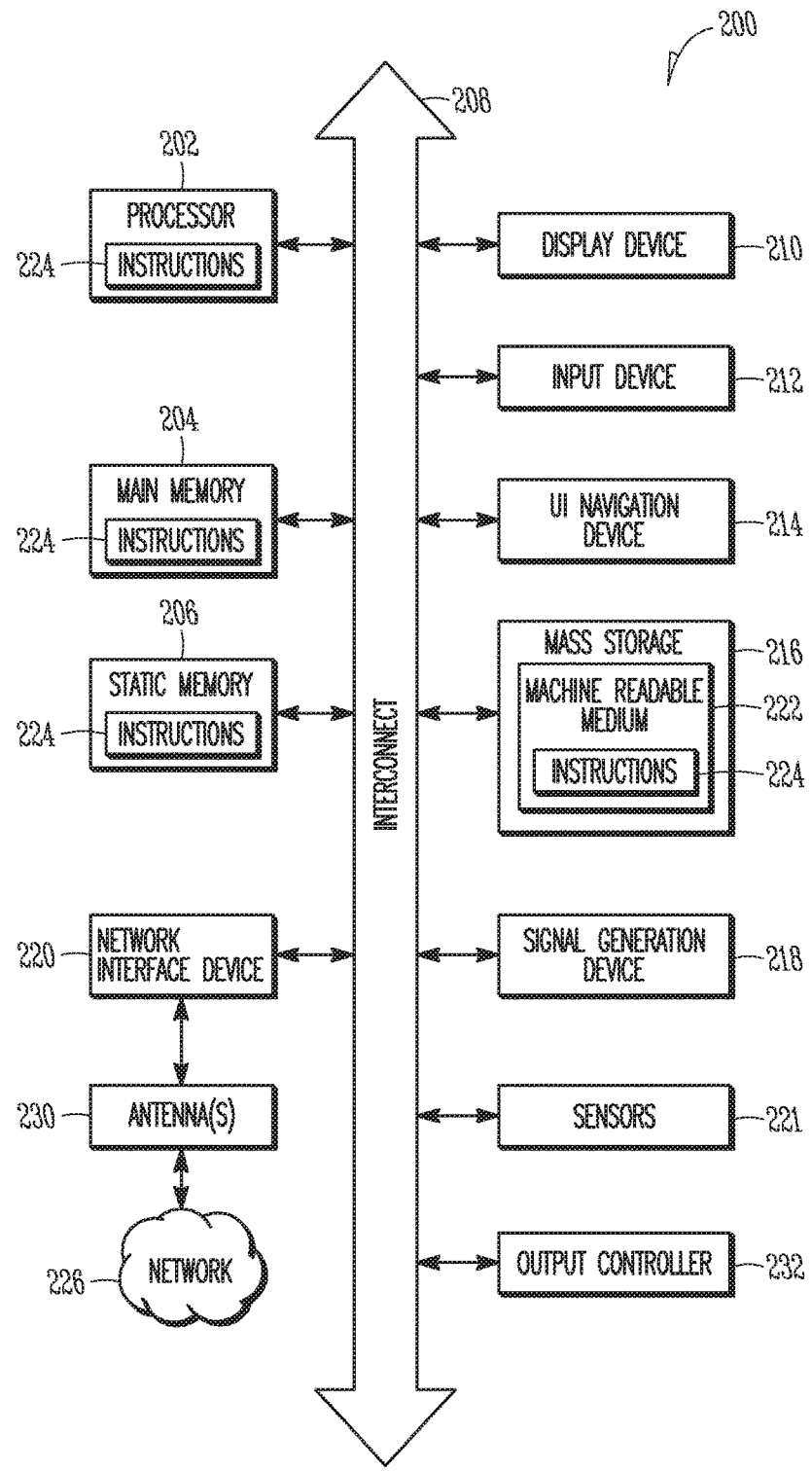
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HE device, HE AP, HE STA, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
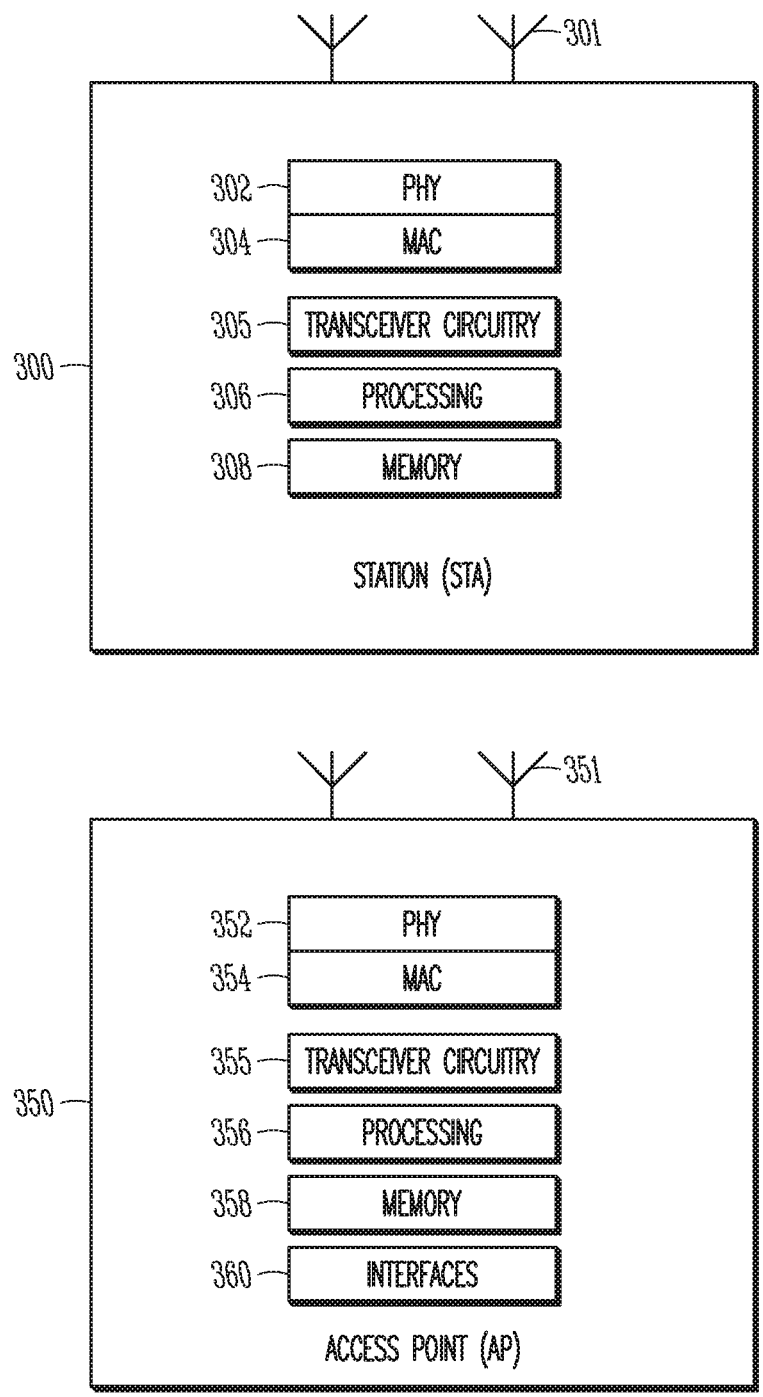
FIG. 3 illustrates a station (STA) in accordance with some embodiments and an access point (AP) in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control (MAC) layer circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control (MAC) layer circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HE device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HE device 104 may be configured to communicate using OFDM communication signals over a multicarrier communication channel. Accordingly, in some cases, the STA 300, AP 350 and/or HE device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HE standards, although the scope of the embodiments is not limited in this respect as they may also be suitable to transmit and/or receive communications in accordance with other techniques and standards. In some other embodiments, the AP 350, HE device 104 and/or the STA 300 configured as an HE device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

In accordance with some embodiments, the STA 103 may receive a medium access control protocol data unit (MPDU) encoded in accordance with a first modulation and coding scheme (MCS). The STA 103 may detect bit errors of the MPDU based on a comparison between the received MPDU and the decoded MPDU. The STA 103 may determine an MCS reception margin parameter based at least partly on a comparison between a number of detected bit errors and a predetermined threshold of bit errors. The STA 103 may transmit a block acknowledgement (BA) frame that includes the MCS reception margin parameter. The MCS reception margin parameter may enable a rate adaptation, from the first MCS to a second MCS for a subsequent MPDU for the STA 103. These embodiments will be described in more detail below.

Figure 4:
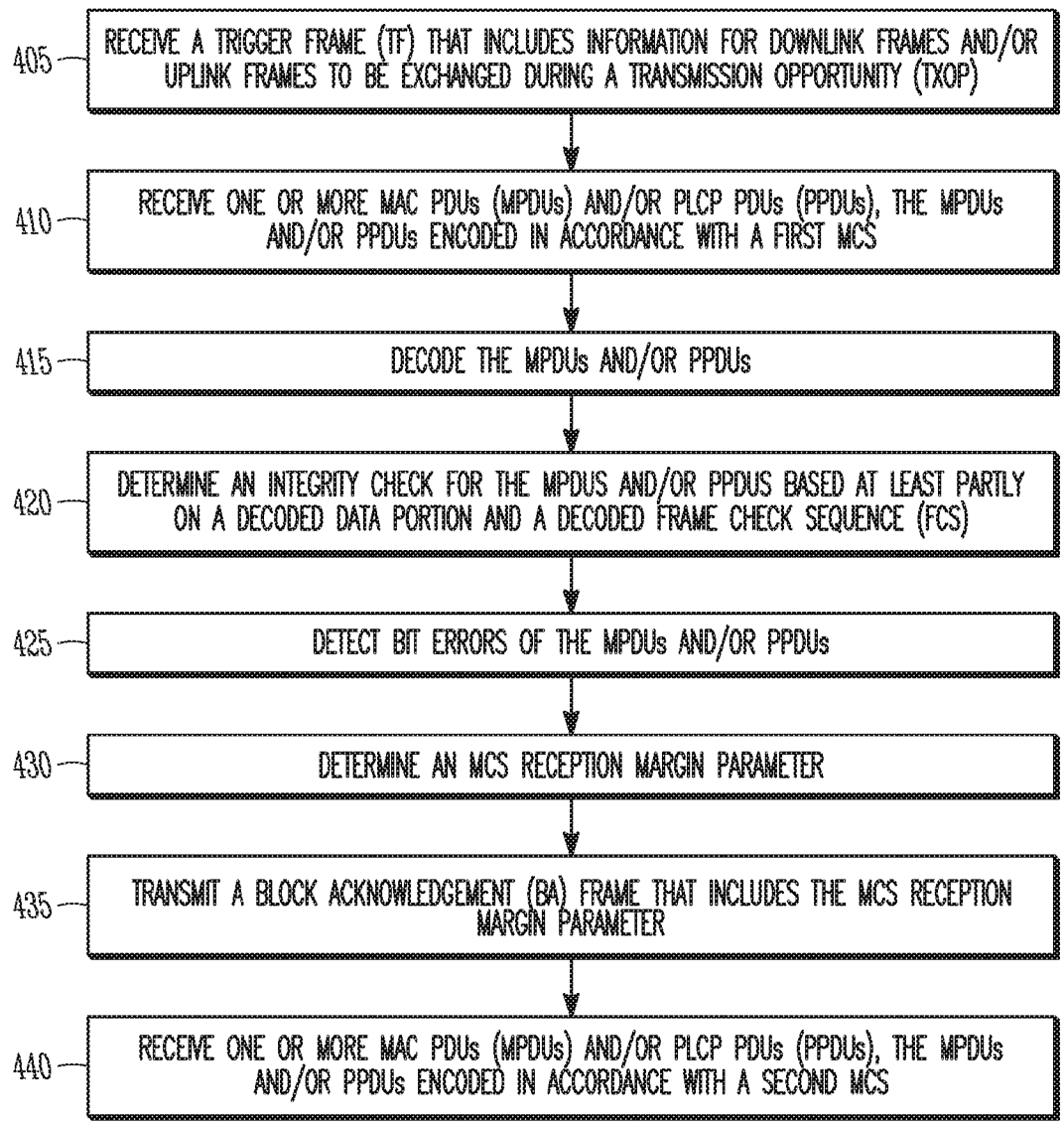
FIG. 4 illustrates the operation of a method of communication in accordance with some embodiments.

FIG. 4 illustrates the operation of a method of communication in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-8, although it is understood that the method 400 may be practiced with any other suitable systems, interfaces and components.

In some embodiments, the STA 103 may be configurable to operate as an HE device 104. Although reference may be made to an STA 103 herein, including as part of the descriptions of the method 400 and/or other methods described herein, it is understood that an HE device 104 and/or STA 103 configurable to operate as an HE device 104 may be used in some embodiments. In addition, the method 400 and other methods described herein may be applicable to STAs 103, HE devices 104 and/or APs 102 operating in accordance with one or more standards and/or protocols, such as 802.11, Wi-Fi, wireless local area network (WLAN) and/or other, but embodiments of those methods are not limited to just those devices. In some embodiments, the method 400 and other methods described herein may be practiced by other mobile devices, such as an Evolved Node-B (eNB) or User Equipment (UE). The method 400 and other methods described herein may also be practiced by wireless devices configured to operate in other suitable types of wireless communication systems, including systems configured to operate according to various Third Generation Partnership Project (3GPP) Long Term Evolution (LTE) standards. The method 400 may also be applicable to an apparatus for an STA 103, HE device 104 and/or AP 102 or other device described above, in some embodiments.

It should also be noted that embodiments are not limited by references herein (such as in descriptions of the methods 400, 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 405 of the method 400, the STA 103 may receive a trigger frame (TF). In some embodiments, the TF may be received from an AP 102, although the scope of embodiments is not limited in this respect. In a non-limiting example, the TF may indicate information to be used by the STA 103 to exchange one or more frames and/or signals with the AP 102 during a transmission opportunity (TXOP). Example frames may include, but are not limited to, MPDUs, PPDUs and/or BA frames. Example information of the TF may include, but is not limited to, time resources to be used for transmission/reception, channel resources to be used for transmission/reception, identifiers of STAs 103 that are to transmit, identifiers of STAs 103 that are to receive and/or other information.

In some embodiments, the AP 102 may contend for the wireless medium during a contention period to receive exclusive control of the medium during a period, including but not limited to a TXOP and/or HE control period. The AP 102 may transmit, receive and/or schedule one or more frames and/or signals during the period. The STA 103 may transmit and/or receive one or more frames and/or signals during the period. However, it should be noted that embodiments are not limited to scheduled transmission/reception or to transmission/reception in accordance with the exclusive control of the medium. Accordingly, an MPDU. PPDU, BA frame and/or other frame may be transmitted/received in contention-based scenarios and/or other scenarios, in some embodiments.

Figure 5:
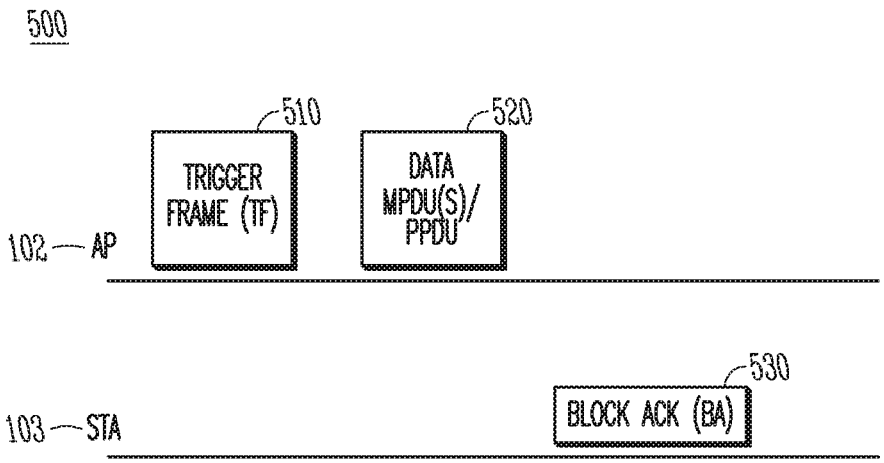
FIG. 5 illustrates an example scenario in accordance with some embodiments.
Figure 6:
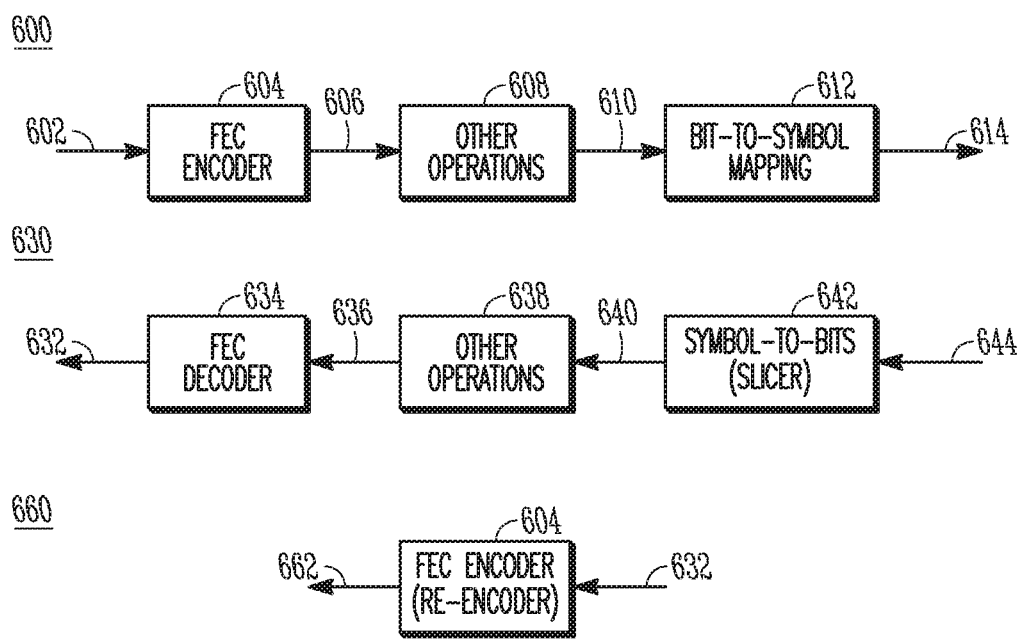
FIG. 6 illustrates example operations in accordance with some embodiments.
Figure 7:
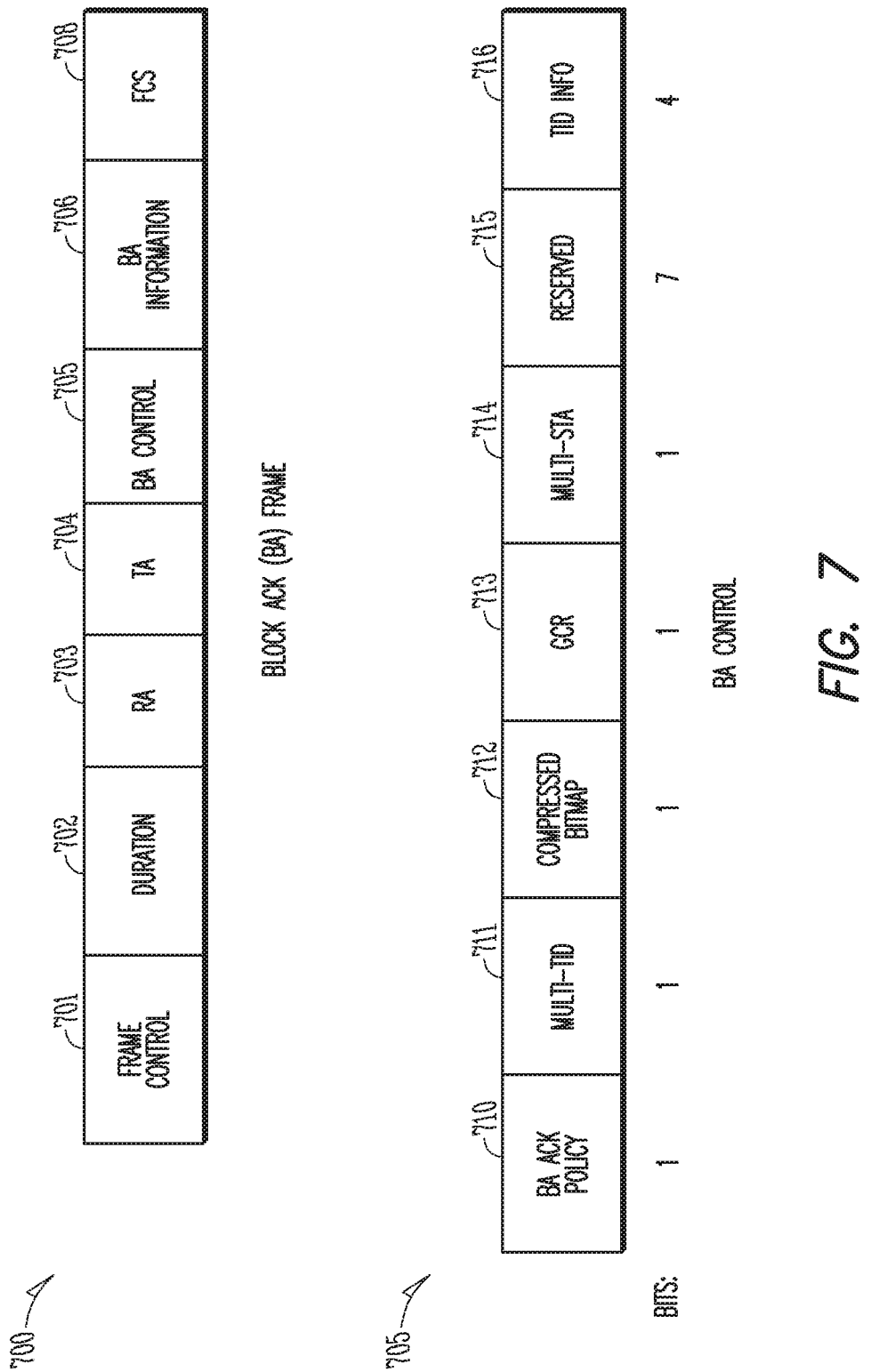
FIG. 7 illustrates example frames that may be exchanged in accordance with some embodiments.

FIG. 5 illustrates an example scenario in accordance with some embodiments. FIG. 6 illustrates example operations in accordance with some embodiments. FIG. 7 illustrates example frames that may be exchanged in accordance with some embodiments. It should be noted that the examples shown in FIGS. 5-7 may illustrate some or all of the concepts and techniques described herein in some cases, but embodiments are not limited by the examples of FIGS. 5-7. For instance, embodiments are not limited by the name, number, type, size, ordering, arrangement and/or other aspects of the frames, signals, fields, data blocks, operations, time resources, channel resources and other elements as shown in FIGS. 5-7. Although some of the elements shown in the examples of FIGS. 5-7 may be included in an 802.11 standard and/or other standard, embodiments are not limited to usage of such elements that are included in standards.

Referring to FIG. 5, in the example scenario 500, the AP 102 may transmit the TF 510 to the STA 103. The TF 510 may indicate information to be used by the STA 103 to receive one or more data frames 520 (such as MPDU(s), PPDU(s) and/or other). The TF 510 may also indicate information to be used by the STA 103 to transmit a BA frame 530, which may include feedback related to rate adaptation such as the MCS reception margin parameter (to be described below) and/or other feedback. In some cases, the BA frame 530 may also include acknowledgement (ACK) bits for the data frames 520. In some cases, the BA frame 530 may include ACK bits for other data frames (such as data frames transmitted by the AP 102 prior to the TF 510). The ACK bits may indicate whether the data frames (520 or other) are successfully decoded, in some embodiments.

At operation 410, the STA 103 may receive one or more MAC PDUs (MPDUs) and/or PLCP PDUs (PPDUs), the MPDUs and/or PPDUs encoded in accordance with a first modulation and coding scheme (MCS). At operation 415, the STA 103 may decode the received MPDU(s) and/or PPDU(s).

In some embodiments, a PPDU may include or may be based on one or more MPDUs and/or other information, such as header information, a frame check sequence (FCS) and/or other. Accordingly, some operations may be described herein in terms of an MPDU, but embodiments are not limited to MPDUs, as some or all of those operations may be applicable to a PPDU and/or other frame, in some cases.

In some embodiments, the first MCS may be included in a candidate group of MCSs. The MCSs of the candidate group may be based on modulation types and forward error correction (FEC) coding rates. Example FEC coding rates may include, but are not limited to, 1/4, 1/3, 1/2, 2/3, 3/4 and/or other. Example modulation types may include, but are not limited to, binary phase shift keying (BPSK), quadrature phase shift keying (QPSK), and quadrature amplitude modulation (QAM) of different sizes. Example sizes of the QAM may include 16 level (16-QAM), 64 level (64-QAM) and/or other. In addition, the modulation type or the MCS may include or may be based on a mapping between bits and modulation symbols (such as constellation points). For instance, each modulation symbol of a 16-QAM constellation may be mapped to a block of 4 bits in accordance with a predetermined bit-to-symbol mapping.

The MCSs may be defined or specified in any suitable manner. In some embodiments, different combinations of the modulation type and FEC coding rate may be mapped to MCS indexes. The MCSs of the candidate group may be mapped to an ordered sequence of MCS indexes in accordance with a predetermined mapping. For instance, the predetermined mapping may be based on a non-decreasing relationship between the MCS indexes and ratios of information bits per modulation symbol of the MCSs. The ratios of information bits per modulation symbol of the MCSs may be based on the modulation types and the FEC coding rates. As examples of such, a combination of BPSK and an FEC coding rate of 1/2 may result in 0.5 bits/symbol, a combination of QPSK and an FEC coding rate of 1/2 may result in 1.0 bits/symbol, and a combination of 64-QAM and an FEC coding rate of 2/3 may result in 4.0 bits/symbol.

In a non-limiting example, a first MCS may be based on a modulation type of BPSK and an FEC coding rate of 1/2, and the first MCS may be mapped to a first index (such as MCS-0). A second MCS may be based on a modulation type of QPSK and an FEC coding rate of 1/2, and the second MCS may be mapped to a second index (such as MCS-1). A third MCS may be based on a modulation type of 64-QAM and an FEC coding rate of 2/3, and the third MCS may be mapped to a third index (such as MCS-7). The example MCSs and mapping (or similar MCSs and mapping) may be part of a standard, such as an 802.11 standard and/or other standard, although embodiments are not limited to MCSs or mappings that are included in a standard.

It should be noted that raising or lowering an MCS may refer to using another MCS of a higher or lower MCS index, in some cases. Embodiments are not limited as such, however. In some embodiments, raising or lowering the MCS may be performed by switching modulation types, switching FEC coding rates or a combination thereof.

In some embodiments, the MPDU(s) may be received in a downlink signal. The downlink signal may be received from the AP 102, in some embodiments, although the scope of embodiments is not limited in this respect. Any suitable format may be used for the downlink signal. As a non-limiting example, the downlink signal may be received in channel resources that include multiple sub-carriers of a predetermined sub-carrier bandwidth. The downlink signal may be an orthogonal frequency division multiplexing (OFDM) signal or an orthogonal frequency division multiple access (OFDMA) signal. Modulation symbols of the downlink signal may be mapped to the sub-carriers for the OFDM signal or OFDMA signal. It should be noted that embodiments are not limited to OFDM signals or to OFDMA signals. As an example, single-carrier frequency division multiplexing (SC-FDM) signals may be used. As another example, modulation symbols of the downlink signal may be multiplexed in time The downlink signal may be based on multiple modulation symbols, which may be encoded (by a transmitting component such as the AP 102 or other component) by one or more transmitter functions, including but not limited to FEC encoding, interleaving, scrambling and/or bit-to-symbol mapping. The STA 103 may generate, based on the modulation symbols of the downlink signal and in accordance with the first modulation type, decoded FEC output bits for input to an FEC decode algorithm. The STA 103 may decoded information bits from the FEC decode algorithm.

Referring to the example operations shown in FIG. 6, one or more transmit/encode operations (as indicated by 600) may be performed. In some embodiments, the AP 102 may perform one or more of the transmit/encode operations to generate one or more MPDUs and/or PPDUs for downlink transmission. Embodiments are not limited to performance of the one or more transmit/encode operations by the AP 102, however. The STA 103 may use one of more of the transmit/encode operations to generate MPDUs and/or PPDUs for uplink transmission.

A group of information bits 602 (such as data bits, control bits and/or other bits) may be encoded by an FEC encoder 604 in accordance with an FEC coding rate (included in the MCS that is used) to generate a group of FEC output bits 606. Any number (including zero) of other operations 608 may be performed to generate input bits 610 for the bit-to-symbol mapping 612. The input bits 610 may be mapped to modulation symbols in accordance with a modulation type of the used MCS (and/or a bit-to-symbol mapping of the used MCS) to generate the output symbols 614. The output symbols 614 may be transmitted and/or used to generate a signal for transmission. For instance, the output symbols 614 may be mapped to sub-carriers for transmission as part of an OFDM or OFDMA signal.

One or more receive/decode operations (as indicated by 630) may be performed. Although embodiments are not limited as such, one or more of the receive/decode operations may be similar to, reciprocal to and/or analogous to one or more of the transmit/encode operations. In some embodiments, the STA 103 may perform the one or more of the receive/decode operations to decode one or more MPDUs and/or PPDUs. Embodiments are not limited to performance of the one or more receive/decode operations by the STA 103, however. The AP 102 may use one of more of the receive/decode operations to decode MPDUs and/or PPDUs received in the uplink.

The received modulation symbols 644 of the received MPDU(s) and/or PPDU(s) may be input to a symbol-to-bit function 642 (such as a slicer or other) to generate a bit sequence 640. The bit sequence 640 may be generated in accordance with the first modulation type of the used MCS. The bit sequence 640 may include hard decisions (0 and 1) or soft decisions or both. Any number (including zero) of other operations 638 may be performed to generate input bits 636 for input to the FEC decoder 634. The input bits 636 for the FEC decoder 634 may be considered as "decoded FEC output bits" in some cases, as the input bits 636 may be analogous to the FEC output bits 606 that are output from the FEC encoder 604 as part of the transmit/encode operations 600. The decoded information bits 632 may be generated by the FEC decoder 634.

At operation 420, the STA 103 may determine an integrity check for the MPDUs and/or PPDUs based at least partly on a decoded data portion and a decoded frame check sequence (FCS). In some embodiments, the FCS may include or may be based on a cyclic redundancy check (CRC) determined (as part of transmit/encode functionality) for a data portion of the MPDU(s)/PPDU(s). As an example, each MPDU may include a data portion and an FCS for the data portion. As another example, the PPDU may include an FCS determined for a portion that includes one or more MPDU(s).

As an example of an integrity check for a particular MPDU, the STA 103 may determine a decoded data portion and a decoded FCS for the data portion. The STA 103 may determine an FCS for the decoded data portion (using operation(s) that would be used as part of the transmit/encode functionality) and may compare the FCS to the decoded FCS. If the FCS and the decoded FCS match, the integrity check may indicate successful decoding of the MPDU. If the FCS and the decoded FCS do not match, the integrity check may indicate a decoding failure for the MPDU.

At operation 425, the STA 103 may detect bit errors of the MPDUs and/or PPDUs. The bit errors of the MPDU may be detected based on a comparison between the received MPDU and the decoded MPDU. For instance, the FEC decoder 634 may decode a block of decoded FEC output bits 636 to generate a block of decoded information bits 632.

As an example of the detection of the bit errors, as part of the FEC decode operation, the FEC decoder 634 may maintain, compute and/or use a count of a number of bit errors that are corrected. For instance, a distance metric, such as a Hamming distance or other, may be part of the FEC decoding algorithm and may be output from the algorithm. The number of bit errors may refer to a number of the decoded FEC output bits 636 that are corrected by the FEC decode operation or may refer to a number of the decoded information bits 632 that are corrected by the FEC decode operation.

As another example of the detection of the bit errors, the STA 103 may encode the decoded information bits in accordance with the FEC encode algorithm to generate re-encoded FEC output bits. The number of detected bit errors of the MPDUs may be based on a comparison between the re-encoded FEC output bits and the decoded FEC output bits. Referring to FIG. 6, as indicated by 660, the decoded information bits 632 output from the FEC decoder 634 may be re-encoded by the FEC encoder 604 to generate the re-encoded FEC output bits 662.

It should be noted that in some operations described herein, such as the determination of the MCS reception margin parameter and/or others, a number of detected bit errors and/or a ratio of detected bit errors to a total number of bits may be used. For instance, the ratio may be based on a total number of input bits 636 to the FEC decoder 634 and/or a total number of output bits 632 from the FEC decoder 634.

At operation 430, the STA 103 may determine an MCS reception margin parameter. At operation 435, the STA 103 may transmit the MCS reception margin parameter to the AP 102 (and/or other component). At operation 440, the STA 103 may receive one or more MPDUs and/or PPDUs which may be encoded in accordance with a second MCS. The MPDU(s) and/or PPDU(s) may be received from the AP 102, in some embodiments, although the scope of embodiments is not limited in this respect.

In some embodiments, the MCS reception margin parameter may indicate a quality of reception at the STA 103, such as for reception of the MPDU(s) and/or PPDU(s). The MCS reception parameter may enable a rate adaptation, such as a switching of a used MCS by the AP 102 for downlink transmission. The second MCS may be another MCS of the candidate group, and the AP 102 may have switched from the first MCS to the second MCS as part of a rate adaptation. For instance, based on the MCS reception margin parameter transmitted at operation 435, the AP 102 may perform the rate adaptation. Accordingly, the AP 102 may switch from the first MCS to a second MCS of the candidate group for a subsequent MPDU for the STA 103, in some cases. The STA 103 may use one or more parameters and/or techniques to determine the MCS reception margin parameter, non-limiting examples of which will be presented below.

In some embodiments, the MCS reception margin parameter may be numerical. As an example, the MCS reception margin parameter may be based on one or more of a number of bit errors corrected, a number of bit errors detected, a ratio between the number of bit errors corrected and a total number of bits, a ratio between the number of bit errors detected and a total number of bits and/or other value. In some cases, the MCS reception margin parameter may be based on a predetermined mapping between ranges of the numbers and/or ratios described above and candidate values for the MCS reception margin parameter. For instance, a first value may be assigned when 0-5 bit errors are detected and a second value may be assigned when 6-20 bit errors are detected, and one or more additional values may be assigned when 21 or more bit errors are detected.

In some embodiments, the MCS reception margin parameter may be based on one or more categories. As an example, values of high or low may be used. As another example, values of high, medium or low may be used. The levels (high, medium and/or low) may be determined based on a predetermined mapping in some cases. For instance, ranges of bit errors detected, the value of "low" may be assigned when 0-5 bit errors are detected, the value of "low" may be assigned when 6-20 bit errors are detected, and the value of "high" may be assigned when 21 or more bit errors are detected. Embodiments are not limited to these three categories, as other suitable categories may be used. Embodiments are also not limited to the usage of three categories, as two, four, five or any suitable number of categories may be used.

In an example, the MCS reception margin parameter may be based at least partly on a comparison between a number of detected bit errors (such as determined at operation 425) and a predetermined threshold of bit errors. It should be noted that a ratio of number of detected bit errors to total number of bits may be used in this example and others below, in some cases. In this example, the STA 103 may set the MCS reception margin parameter to a first value when the number of detected bit errors is below the threshold and may set the MCS reception margin parameter to a second value when the number of detected bit errors is above or equal to the threshold. For instance, the first value may indicate that, because the number of detected bit errors may be sufficiently low, that the AP 102 may use a higher MCS than the first MCS for a subsequent transmission of MPDU(s) and/or PPDU(s) to the STA 103. The second value may indicate that, because the number of detected bit errors is higher than the threshold, that the AP 102 may use a lower MCS or that the AP 102 may use the same MCS (the first MCS) for the subsequent transmission of MPDU(s) and/or PPDU(s) to the STA 103. It should be noted that the strategy described is not limiting in terms of number of thresholds, number of possible values of the MCS reception margin parameter, whether to lower, retain and/or raise the MCS, how much to lower or raise the MCS and/or other aspects.

In another example, more than two predetermined thresholds may be used, and different numbers of detected bit errors (or ratios of number of detected bit errors to total number of bits, in some cases) may be mapped to different candidate values of the MCS reception margin parameter. The AP 102 may perform operations, such as raise, retain and/or lower the MCS based at least partly on the MCS reception margin parameter.

In another example, the MCS reception margin parameter may be based at least partly on an integrity check, including but not limited to the check determined at operation 420. In some embodiments, multiple factors may be used. For instance, the MCS reception margin parameter may be based at least partly on the number of detected bit errors and the integrity check, in some cases. The STA 103 may set the MCS reception margin parameter to a first value when the number of detected bit errors is below the threshold; may set the MCS reception margin parameter to a second value when the number of detected bit errors is above the threshold and when the integrity check indicates a successful decoding of the MPDU; and may set the MCS reception margin parameter to a third value when the number of detected bit errors is above the threshold and when the integrity check indicates an unsuccessful decoding of the MPDU. Any suitable relationship between the values of the MCS reception margin parameter and operations of the rate adaptation may be used. In a non-limiting example, the first value of the MCS reception margin parameter may indicate a recommendation for the rate adaptation that the second MCS is to be lower than the first MCS (the AP 102 is to lower the MCS); the second value of the MCS reception margin parameter may indicate a recommendation for the rate adaptation that the second MCS is to be unchanged with respect to the first MCS (the AP 102 is to refrain from changing the MCS); and the third value of the MCS reception margin parameter may indicate a recommendation for the rate adaptation that the second MCS is to be higher than the first MCS (the AP 102 is to raise the MCS).

In another example, a comparison between an input and an output of a channel decoder (such as the FEC decoder) may be performed. If the comparison/difference is low (such as below a first threshold), then the channel decoder may not have been used. Accordingly, frames encoded in accordance with a current MCS may be received easily by the STA 103 and there may be a margin to either increase the MCS or to decrease a transmit power. The STA 103 may indicate a high value margin in the MCS reception margin. If the comparison/difference is high (such as above the first threshold and below a second threshold) but an FCS check indicates a successful reception (packet correctly received), the channel decoder may have been used, and the current MCS may be close to a maximum operating point. The STA 103 may then indicate a low value margin in the MCS reception margin. Such an indication may instruct the originator (such as the AP 102) to not increase MCS. If the comparison/difference is higher (such as above the second threshold) and the FCS check indicates unsuccessful reception (packet not received), the STA 103 may then indicate an even lower value margin in the MCS reception margin. Such an indication may instruct the originator (such as the AP 102) that it should reduce the MCS.

It should be noted that the STA 103 may determine one or more MCS reception margin parameters for any number of MPDU(s) and/or PPDU(s). As an example, the STA 103 may determine MCS reception margin parameter(s) per MPDU. As another example, the STA 103 may determine an MCS reception margin parameter per PPDU. For instance, an aggregation of multiple MPDUs may be included in a PPDU received from the AP and the MPDUs of the PPDU may be encoded in accordance with the first MCS. The STA 103 may decode the multiple MPDUs. The STA 103 may perform one or more of the following operations: detect bit errors of the MPDUs based on comparisons between the received MPDUs and the decoded MPDUs; perform one or more integrity checks on the MPDUs; perform one or more integrity checks on the PPDU; compare numbers of detected bit errors of the MPDUs to one or more predetermined thresholds; compare a combined number of detected bit errors of the MPDUs (such as a total number of detected bit errors of the PPDU); and/or others. The STA 103 may determine multiple MCS reception margin parameters for the multiple MPDUs, a joint MCS reception margin parameter for the multiple MPDUs and/or other type of MCS reception margin parameter.

The STA 103 may encode, for transmission, a block acknowledgement (BA) frame that includes the MCS reception margin parameter. The BA frame may be transmitted to the AP 102, in some embodiments, although the scope of embodiments is not limited in this respect. The BA frame may include a single MCS reception margin parameter, multiple MCS reception margin parameters and/or a joint MCS reception margin parameter. It should be noted that embodiments are not limited to usage of the BA frame to communicate the MCS reception margin parameter, as any suitable message may be used, by the STA 103, to communicate the MCS reception margin parameter to the AP 102 and/or other component.

It should be noted that the BA frame may include ACK bits for one or more MPDUs and/or PPDUs (and/or other information related to reception of the MPDU(s) and/or PPDU(s)), including but not limited to those received at operation 410. For instance, the BA frame 530 may include ACK bits for the MPDUs/PPDU(s) 520 in FIG. 5. The ACK bits may indicate whether the MPDU(s)/PPDU(s) 520 are successfully received. The BA frame may also include other information related to the reception of the MPDU(s)/PPDU(s) 520.

Referring to FIG. 7, an example Block Acknowledgement (BA) frame is shown. It should be noted that the example BA frame 700 shown in FIG. 7 may illustrate some or all of the concepts and techniques described herein in some cases, but embodiments are not limited by the example BA frame 700. For instance, embodiments are not limited by the name, number, type, size, ordering, arrangement and/or other aspects of the fields, blocks, and other elements as shown in FIG. 7. In some embodiments, a BA frame may include one or more of the fields shown in FIG. 7. In some embodiments, a BA frame may include one or more additional fields. In some embodiments, a BA frame may not necessarily include all fields shown in FIG. 7. Although the example BA frame 700 and/or some of the fields included in it may be included in an 802.11 standard and/or other standard, embodiments are not limited to usage of such elements that are included in standards.

The BA frame 700 may include a BA control parameter 705. The BA frame 700 may include one or more other parameters, including but not limited to a frame control parameter 701, duration parameter 702, receive antenna (RA) parameter 703, transmit antenna (TA) parameter 704, BA information parameter 706, FCS 708 and/or other parameter(s). The BA control parameter 705 may include one or more reserved bits 715. The BA control parameter 705 may also include one or more other fields, including but not limited to, a BA ACK policy parameter 710, multi traffic identifier (multi-TID) parameter 711, compressed bitmap parameter 712, GCR parameter 713, multi-STA parameter 714, traffic identifier (TID) Info parameter 716 and/or other parameter(s).

In some embodiments, the MCS reception margin parameter may be included in the BA frame 700. As an example, an additional field may be included in the BA frame 700 for the MCS reception margin parameter. As another example, one or more of the reserved bits 715 may be allocated for the MCS reception margin parameter. As another example, the MCS reception margin parameter may be included in an HE-A control field. As another example, the MCS reception margin parameter may be included in any suitable portion of a MAC header. As another example, the MCS reception margin parameter may be included in any suitable portion of a PHY header.

The MCS reception margin parameter may include any suitable number of bits. In some embodiments, two bits may be used. Embodiments are not limited to two bits, as other suitable sizes for the MCS reception margin parameter may be used, such as one bit, three bits, four bits or even larger numbers of bits.

Figure 8:
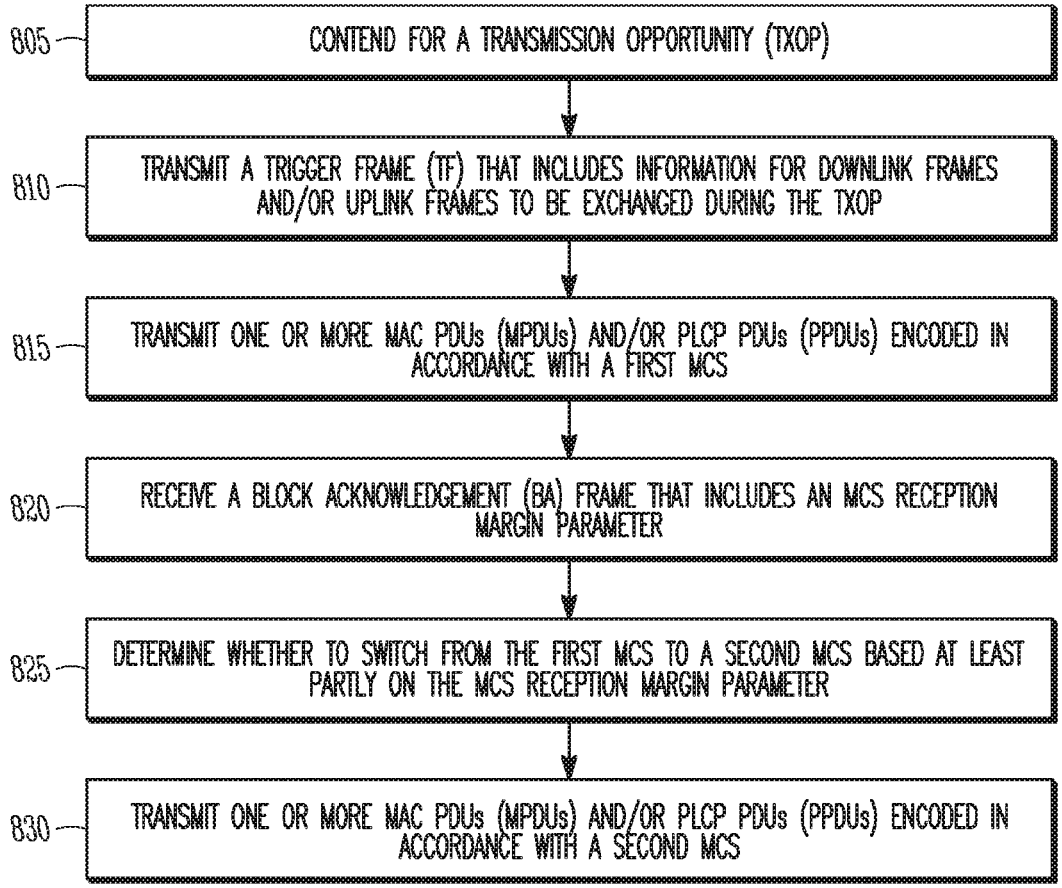
FIG. 8 illustrates the operation of another method of communication in accordance with some embodiments.

FIG. 8 illustrates the operation of another method of communication in accordance with some embodiments. As mentioned previously regarding the method 400, embodiments of the method 800 may include additional or even fewer operations or processes in comparison to what is illustrated in FIG. 8 and embodiments of the method 800 are not necessarily limited to the chronological order that is shown in FIG. 8. In describing the method 800, reference may be made to FIGS. 1-7, although it is understood that the method 800 may be practiced with any other suitable systems, interfaces and components.

In some embodiments, the AP 102 may be configurable to operate as an HE device 104. Although reference may be made to an STA 103 herein, including as part of the descriptions of the method 800 and/or other methods described herein, it is understood that an HE device 104 and/or AP 102 configurable to operate as an HE device 104 may be used in some embodiments. In addition, embodiments of the method 800 may be applicable to APs 102, STAs 103, UEs, eNBs or other wireless or mobile devices. The method 800 may also be applicable to an apparatus for an AP 102, STA 103 and/or other device described above.

It should be noted that the method 800 may be practiced by an AP 102 and may include exchanging of elements, such as frames, signals, messages, fields and/or other elements, with an STA 103. Similarly, the method 400 may be practiced at an STA 103 and may include exchanging of such elements with an AP 102. In some cases, operations and techniques described as part of the method 400 may be relevant to the method 800. In addition, embodiments of the method 800 may include operations performed at the AP 102 that are reciprocal to or similar to other operations described herein performed at the STA 103. For instance, an operation of the method 800 may include reception of a frame from the STA 103 by the AP 102 while an operation of the method 400 may include transmission of the same frame or similar frame by the STA 103.

In addition, previous discussion of various techniques and concepts may be applicable to the method 800 in some cases, including trigger frames (TFs), MPDUs, PPDUs, MCSs, rate adaptation, candidate group of MCSs, MCS reception margin parameter, BA frames, detection of bit errors, integrity check, transmit/encoder operations, receive/decoder operations and/or others. In addition, one or more of the examples shown in FIGS. 5-7 may also be applicable, in some cases, although the scope of embodiments is not limited in this respect.

At operation 805 of the method 800, the AP 102 may contend for access to a wireless medium. In some embodiments, the AP 102 may contend for the wireless medium during a contention period to receive exclusive control of the medium during a period, including but not limited to a TXOP and/or HE control period. The AP 102 may transmit a frame and/or message during the TXOP and/or HE control period, in some embodiments. However, it should be noted that embodiments are not limited to transmission during the TXOP and/or HE control period or transmission in accordance with the exclusive control of the medium. Accordingly, an MPDU, PPDU and/or other frame/sub-frame may be transmitted in contention-based scenarios and/or other scenarios, in some cases.

At operation 810, the AP 102 may transmit a trigger frame (TF) that includes information for downlink frames and/or uplink frames to be exchanged during the TXOP. In some embodiments, the TF may indicate first time resources of the TXOP to be used by the STA 103 to receive the MPDU and second time resources of the TXOP to be used by the STA 103 to transmit the BA frame.

At operation 815, the AP 102 may transmit one or more MAC PDUs (MPDUs) and/or PLCP PDUs (PPDUs) encoded in accordance with a first MCS of a candidate group of MCSs. The MPDU(s) and/or PPDU(s) may be transmitted in a downlink signal of any suitable format. As a non-limiting example, the downlink signal may be transmitted in channel resources that include multiple sub-carriers of a predetermined sub-carrier bandwidth. The downlink signal may be an orthogonal frequency division multiplexing (OFDM) signal or an orthogonal frequency division multiple access (OFDMA) signal. The modulation symbols of the downlink signal may be mapped to the sub-carriers for the OFDM signal or OFDMA signal. This example is not limiting, however, as other types of signals may be used. As an example, single-carrier frequency division multiplexing (SC-FDM) signals may be used. As another example, modulation symbols of the transmitted signal may be multiplexed in time.

In some embodiments, the MCSs of the candidate group may be mapped to an ordered sequence of MCS indexes in accordance with a predetermined mapping. For instance, the predetermined mapping may be based on a non-decreasing relationship between the MCS indexes and ratios of information bits per modulation symbol of the MCSs. The ratios of information bits per modulation symbol of the MCSs may be based on the modulation types and the forward error correction (FEC) coding rates.

At operation 820, the AP 102 may receive a block acknowledgement (BA) frame that includes an MCS reception margin parameter. In some embodiments, the MCS reception margin parameter may be based on one or more measurements of the STA, including but not limited to detection of bit errors in the MPDU(s) and/or PPDU(s), a comparison between a predetermined threshold of bit errors and a number of bit errors detected, one or more integrity checks of the MPDU(s) and/or PPDU(s) and/or other measurements.

At operation 825, the AP 102 may determine whether to switch from the first MCS to a second MCS based at least partly on the MCS reception margin parameter. At operation 830, the AP 102 may transmit one or more MAC PDUs (MPDUs) and/or PLCP PDUs (PPDUs) encoded in accordance with a second MCS.

In a non-limiting example, the AP 102 may transmit an MPDU that is based on a data portion and a frame check sequence (FCS) that is based at least partly on the data portion. The MCS reception margin parameter may be further based at least partly on an integrity check by the STA 103, in accordance with the FCS, that indicates whether the MPDU is decoded successfully at the STA 103. When the MCS reception margin parameter indicates a first value in which the number of detected bit errors is below the threshold, the AP 102 may select the second MCS as one of the MCSs of the candidate group that is higher than the first MCS. When the MCS reception margin parameter indicates a second value in which the number of detected bit errors is above the threshold and the integrity check indicates a successful decoding of the MPDU, the AP 102 may select the second MCS as the first MCS. When the MCS reception margin parameter indicates a third value in which the number of detected bit errors is above the threshold and the integrity check indicates an unsuccessful decoding of the MPDU, the AP 102 may select the second MCS as one of the MCSs of the candidate group that is lower than the first MCS. Embodiments are not limited by this example, as other techniques, including but not limited to those described herein, may be used.

It should be noted that some operations are described herein as part of downlink transmission of data. That is, the AP 102 may generate MPDU(s) and/or PPDU(s) for downlink transmission, may receive feedback from the STA 103, and may perform rate adaptation to switch or retain an MCS used for the downlink transmission of subsequent MPDU(s) and/or PPDU(s). Embodiments are not limited to downlink transmission of data, however. In some embodiments, one or more operations and/or techniques described herein may be performed as part of uplink transmission of data. For instance, the STA 103 may generate data frames (such as MPDU(s) and/or PPDU(s)) for uplink transmission in accordance with a first MCS. The AP 102 may determine feedback that may be or may be similar to the MCS reception margin parameter, and may transmit the feedback to the STA 103. In some embodiments, the STA 103 may perform rate adaptation to determine whether to switch or retain an MCS used for the uplink transmission of subsequent MPDU(s) and/or PPDU(s). In some embodiments, the AP 102 may perform the rate adaptation. For instance, the AP 102 may use one or more techniques described herein, such as detection of bit errors, integrity checks, threshold comparisons, determination of the MCS reception margin parameter and/or determination of whether to switch or retain the MCS for subsequent data transmissions. In such cases, the AP 102 may communicate, to the STA 103, the new MCS that is to be used by the STA 103 for the subsequent data transmission.

In Example 1, an apparatus of a station (STA) may comprise memory. The apparatus may further comprise processing circuitry. The processing circuitry may be configured to decode a first medium access control protocol data unit (MPDU), the first MPDU encoded in accordance with a first modulation and coding scheme (MCS). The processing circuitry may be further configured to detect bit errors of the first MPDU based on a comparison between the received first MPDU and the decoded first MPDU. The processing circuitry may be further configured to determine an MCS reception margin parameter based at least partly on a comparison between a number of detected bit errors of the first MPDU and a predetermined threshold of bit errors. The processing circuitry may be further configured to encode, for transmission, a block acknowledgement (BA) frame that includes the MCS reception margin parameter and further includes an acknowledgement bit that indicates whether the first MPDU is successfully decoded. The processing circuitry may be further configured to decode a second MPDU that is encoded in accordance with a second, updated MCS that is based at least partly on the MCS reception margin parameter.

In Example 2, the subject matter of Example 1, wherein the processing circuitry may be further configured to decode a trigger frame (TF) that indicates time resources and channel resources to be used during a transmission opportunity (TXOP) by the STA to receive the first MPDU and to transmit the BA frame. The TXOP may be a time period obtained by an access point (AP). The second MPDU may be received during the TXOP subsequently to the first MPDU.

In Example 3, the subject matter of one or any combination of Examples 1-2, wherein the MCS reception margin parameter may enable a rate adaptation, from the first MCS to the second MCS for the second MPDU.

In Example 4, the subject matter of one or any combination of Examples 1-3, wherein the processing circuitry may be further configured to set the MCS reception margin parameter to a first value when the number of detected bit errors is below the threshold. The processing circuitry may be further configured to set the MCS reception margin parameter to a second value when the number of detected bit errors is above the threshold.

In Example 5, the subject matter of one or any combination of Examples 1-4, wherein the processing circuitry may be further configured to determine the MCS reception margin parameter further based at least partly on: a comparison between the number of detected bit errors and a plurality of predetermined thresholds of bit errors, and a predetermined mapping between the thresholds and candidate values of the MCS reception margin parameter.

In Example 6, the subject matter of one or any combination of Examples 1-5, wherein the first MPDU may include a data portion and a frame check sequence (FCS) that is based at least partly on the data portion. The decoded first MPDU may include a decoded data portion and a decoded FCS based at least partly on the decoded data portion. The processing circuitry may be further configured to determine an integrity check of the decoded first MPDU based at least partly on the decoded data portion and the decoded FCS. The processing circuitry may be further configured to determine the MCS reception margin parameter further based at least partly on the integrity check of the decoded first MPDU.

In Example 7, the subject matter of one or any combination of Examples 1-6, wherein the processing circuitry may be further configured to set the MCS reception margin parameter to a first value when the number of detected bit errors is below the threshold. The processing circuitry may be further configured to set the MCS reception margin parameter to a second value when the number of detected bit errors is above the threshold and when the integrity check indicates a successful decoding of the first MPDU. The processing circuitry may be further configured to set the MCS reception margin parameter to a third value when the number of detected bit errors is above the threshold and when the integrity check indicates an unsuccessful decoding of the first MPDU.

In Example 8, the subject matter of one or any combination of Examples 1-7, wherein the first value of the MCS reception margin parameter may indicate a recommendation for the rate adaptation that the second MCS is to be lower than the first MCS. The second value of the MCS reception margin parameter may indicate a recommendation for the rate adaptation that the second MCS is to be unchanged with respect to the first MCS. The third value of the MCS reception margin parameter may indicate a recommendation for the rate adaptation that the second MCS is to be higher than the first MCS.

In Example 9, the subject matter of one or any combination of Examples 1-8, wherein the first and second MCSs may be based on modulation types and forward error correction (FEC) coding rates. The first MPDU may be received in a downlink signal received from the AP. The downlink signal may be based on multiple modulation symbols encoded by a bit-to-symbol mapping of FEC output bits in accordance with a first modulation type of the first MCS. The FEC output bits may be based on information bits encoded by an FEC encode algorithm in accordance with a first coding rate of the first MCS.

In Example 10, the subject matter of one or any combination of Examples 1-9, wherein the downlink signal may be received in channel resources that include multiple sub-carriers of a predetermined sub-carrier bandwidth. The downlink signal may be an orthogonal frequency division multiplexing (OFDM) signal or an orthogonal frequency division multiple access (OFDMA) signal. The modulation symbols of the downlink signal may be mapped to the sub-carriers for the OFDM signal or OFDMA signal.

In Example 11, the subject matter of one or any combination of Examples 1-10, wherein the processing circuitry may be further configured to generate, based on the modulation symbols of the downlink signal and in accordance with the first modulation type, decoded FEC output bits for input to an FEC decode algorithm. The processing circuitry may be further configured to generate decoded information bits from the FEC decode algorithm. The number of bit errors of the first MPDU may be based on a distance metric determined as part of the FEC decode algorithm.

In Example 12, the subject matter of one or any combination of Examples 1-11, wherein the processing circuitry may be further configured to generate, based on the modulation symbols of the downlink signal and in accordance with the first modulation type, decoded FEC output bits for input to an FEC decode algorithm. The processing circuitry may be further configured to generate decoded information bits from the FEC decode algorithm. The processing circuitry may be further configured to encode the decoded information bits in accordance with the FEC encode algorithm to generate re-encoded FEC output bits. The number of detected bit errors of the first MPDU may be based on a comparison between the re-encoded FEC output bits and the decoded FEC output bits.

In Example 13, the subject matter of one or any combination of Examples 1-12, wherein the first and second MCSs may be included in a candidate group of MCSs. The MCSs of the candidate group may be mapped to an ordered sequence of MCS indexes in accordance with a predetermined mapping. The predetermined mapping may be based on a non-decreasing relationship between the MCS indexes and ratios of information bits per modulation symbol of the MCSs. The ratios of information bits per modulation symbol of the MCSs may be based on the modulation types and the forward error correction (FEC) coding rates.

In Example 14, the subject matter of one or any combination of Examples 1-13, wherein the first MPDU may be included in an aggregation of multiple MPDUs included in a physical layer convergence procedure protocol data unit (PPDU) received from the AP. The MPDUs of the PPDU may be encoded in accordance with the first MCS. The processing circuitry may be further configured to decode the multiple MPDUs of the PPDU. The processing circuitry may be further configured to detect bit errors of the MPDUs of the PPDU based on comparisons between the received MPDUs of the PPDU and the decoded MPDUs of the PPDU. The processing circuitry may be further configured to determine, based on one or more comparisons between numbers of detected bit errors and the predetermined threshold, multiple MCS reception margin parameters for the multiple MPDUs of the PPDU or a joint MCS reception margin parameter for the multiple MPDUs of the PPDU. The BA frame may include the multiple MCS reception margin parameters or the joint MCS reception margin parameter.

In Example 15, the subject matter of one or any combination of Examples 1-14, wherein the processing circuitry may include a baseband processor to decode the MPDUs, to detect the bit errors of the first MPDU, to determine the MCS reception margin parameter, and to encode the BA frame.

In Example 16, the subject matter of one or any combination of Examples 1-15, wherein the apparatus may further includes a transceiver to receive the MPDUs and to transmit the BA frame.

In Example 17, a non-transitory computer-readable storage medium may store instructions for execution by one or more processors to perform operations for communication by a station (STA). The operations may configure the one or more processors to decode a trigger frame (TF) that indicates time resources and channel resources to be used during a transmission opportunity (TXOP) by the STA to receive a first medium access control protocol data unit (MPDU) and to transmit a block acknowledgement (BA) frame. The operations may further configure the one or more processors to decode the first MPDU, wherein the first MPDU is encoded in accordance with a first modulation and coding scheme (MCS). The operations may further configure the one or more processors to determine an acknowledgement bit that indicates whether the first MPDU is successfully decoded and determine an MCS reception margin parameter based at least partly on the acknowledgement bit. The operations may further configure the one or more processors to encode, the BA frame for transmission, wherein the BA frame includes the MCS reception margin parameter and the acknowledgement bit. The operations may further configure the one or more processors to decode a second MPDU that is received during the TXOP and is encoded in accordance with a second MCS that is based at least partly on the MCS reception margin parameter.

In Example 18, the subject matter of Example 17, wherein the first and second MPDUs may be received from an access point (AP). The TXOP may be a time period obtained by the AP. The second MPDU may be received during the TXOP subsequently to the first MPDU.

In Example 19, the subject matter of one or any combination of Examples 17-18, wherein the operations may further configure the one or more processors to detect bit errors of the first MPDU based on a comparison between the received first MPDU and the decoded first MPDU. The operations may further configure the one or more processors to determine the MCS reception margin parameter further based at least partly on a comparison between a number of detected bit errors of the first MPDU and a predetermined threshold of bit errors.

In Example 20, a method of communication at a station (STA) may comprise decoding a first medium access control protocol data unit (MPDU), the first MPDU encoded in accordance with a first modulation and coding scheme (MCS). The method may further comprise detecting bit errors of the first MPDU based on a comparison between the received first MPDU and the decoded first MPDU. The method may further comprise determining an MCS reception margin parameter based at least partly on a comparison between a number of detected bit errors of the first MPDU and a predetermined threshold of bit errors. The method may further comprise encoding, for transmission, a block acknowledgement (BA) frame that includes the MCS reception margin parameter and further includes an acknowledgement bit that indicates whether the first MPDU is successfully decoded. The method may further comprise decoding a second MPDU that is encoded in accordance with a second, updated MCS that is based at least partly on the MCS reception margin parameter.

In Example 21, the subject matter of Example 20, wherein the method may further comprise decoding a trigger frame (TF) that indicates time resources and channel resources to be used during a transmission opportunity (TXOP) by the STA to receive the first MPDU and to transmit the BA frame. The TXOP may be a time period obtained by an access point (AP). The second MPDU may be received during the TXOP subsequently to the first MPDU.

In Example 22, an apparatus of an access point (AP) may comprise memory. The apparatus may further comprise processing circuitry. The processing circuitry may be configured to generate, in accordance with a first modulation and coding scheme (MCS) of a candidate group of MCSs, a first medium access control protocol data unit (MPDU) for transmission to a station (STA). The processing circuitry may be further configured to decode a block acknowledgement (BA) frame received from the STA, wherein the BA frame includes an MCS reception margin parameter that is based at least partly on a comparison between a predetermined threshold of bit errors and a number of bit errors detected, by the STA, in the first MPDU received at the STA. The processing circuitry may be further configured to determine, based at least partly on the MCS reception margin parameter, whether to switch from the first MCS to a second MCS of the candidate group to generate a second, subsequent MPDU for the STA.

In Example 23, the subject matter of Example 22, wherein the processing circuitry may be further configured to contend for a transmission opportunity (TXOP) in which the AP is to control access to channel resources. The processing circuitry may be further configured to encode, for transmission during the TXOP, a trigger frame (TF) that indicates first time resources of the TXOP to be used by the STA to receive the MPDU and second time resources of the TXOP to be used by the STA to transmit the BA frame. The processing circuitry may be further configured to encode the second MPDU for transmission during the TXOP.

In Example 24, the subject matter of one or any combination of Examples 22-23, wherein the MPDU may be based on a data portion and a frame check sequence (FCS) that is based at least partly on the data portion. The MCS reception margin parameter may be further based at least partly on an integrity check by the STA, in accordance with the FCS, that indicates whether the MPDU is decoded successfully at the STA. The processing circuitry may be further configured to, when the MCS reception margin parameter indicates a first value in which the number of detected bit errors is below the threshold, select the second MCS as one of the MCSs of the candidate group that is higher than the first MCS. The processing circuitry may be further configured to, when the MCS reception margin parameter indicates a second value in which the number of detected bit errors is above the threshold and the integrity check indicates a successful decoding of the MPDU, select the second MCS as the first MCS. The processing circuitry may be further configured to, when the MCS reception margin parameter indicates a third value in which the number of detected bit errors is above the threshold and the integrity check indicates an unsuccessful decoding of the MPDU, select the second MCS as one of the MCSs of the candidate group that is lower than the first MCS.

In Example 25, the subject matter of one or any combination of Examples 22-24, wherein the MCSs of the candidate group may be mapped to an ordered sequence of MCS indexes in accordance with a predetermined mapping. The predetermined mapping may be based on a non-decreasing relationship between the MCS indexes and ratios of information bits per modulation symbol of the MCSs. The ratios of information bits per modulation symbol of the MCSs may be based on the modulation types and the forward error correction (FEC) coding rates.

In Example 26, the subject matter of one or any combination of Examples 22-25, wherein the MPDU may be transmitted as part of a downlink signal in channel resources that include multiple sub-carriers of a predetermined sub-carrier bandwidth. The downlink signal may be an orthogonal frequency division multiplexing (OFDM) signal or an orthogonal frequency division multiple access (OFDMA) signal. The modulation symbols of the downlink signal may be mapped to the sub-carriers for the OFDM signal or OFDMA signal.

In Example 27, an apparatus of a station (STA) may comprise means for decoding a trigger frame (TF) that indicates time resources and channel resources to be used during a transmission opportunity (TXOP) by the STA to receive a first medium access control protocol data unit (MPDU) and to transmit a block acknowledgement (BA) frame. The apparatus may further comprise means for decoding the first MPDU, wherein the first MPDU is encoded in accordance with a first modulation and coding scheme (MCS). The apparatus may further comprise means for determining an acknowledgement bit that indicates whether the first MPDU is successfully decoded and determine an MCS reception margin parameter based at least partly on the acknowledgement bit. The apparatus may further comprise means for encoding, the BA frame for transmission, wherein the BA frame includes the MCS reception margin parameter and the acknowledgement bit. The apparatus may further comprise means for decoding a second MPDU that is received during the TXOP and is encoded in accordance with a second MCS that is based at least partly on the MCS reception margin parameter.

In Example 28, the subject matter of Example 27, wherein the first and second MPDUs may be received from an access point (AP). The TXOP may be a time period obtained by the AP. The second MPDU may be received during the TXOP subsequently to the first MPDU.

In Example 29, the subject matter of one or any combination of Examples 27-28, wherein the apparatus may further comprise means for detecting bit errors of the first MPDU based on a comparison between the received first MPDU and the decoded first MPDU. The apparatus may further comprise means for determining the MCS reception margin parameter further based at least partly on a comparison between a number of detected bit errors of the first MPDU and a predetermined threshold of bit errors.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising: memory; and processing circuitry, configured to:
decode a first medium access control protocol data unit (MPDU), the first MPDU encoded in accordance with a first modulation and coding scheme (MCS);
detect bit errors of the first MPDU based on a comparison between the received first MPDU and the decoded first MPDU;
determine an MCS reception margin parameter based at least partly on a comparison between a number of detected bit errors of the first MPDU and a predetermined threshold of bit errors;
encode, for transmission, a block acknowledgement (BA) frame that includes the MCS reception margin parameter and further includes an acknowledgement bit that indicates whether the first MPDU is successfully decoded; and
decode a second MPDU that is encoded in accordance with a second, updated MCS that is based at least partly on the MCS reception margin parameter.

2. The apparatus according to claim 1, the processing circuitry further configured to:
decode a trigger frame (TF) that indicates time resources and channel resources to be used during a transmission opportunity (TXOP) by the STA to receive the first MPDU and to transmit the BA frame,
wherein the TXOP is a time period obtained by an access point (AP), and
wherein the second MPDU is received during the TXOP subsequently to the first MPDU.

3. The apparatus according to claim 2, wherein the MCS reception margin parameter enables a rate adaptation, from the first MCS to the second MCS for the second MPDU.

4. The apparatus according to claim 2, the processing circuitry further configured to:
set the MCS reception margin parameter to a first value when the number of detected bit errors is below the threshold; and
set the MCS reception margin parameter to a second value when the number of detected bit errors is above the threshold.

5. The apparatus according to claim 2, the processing circuitry further configured to determine the MCS reception margin parameter further based at least partly on:
a comparison between the number of detected bit errors and a plurality of predetermined thresholds of bit errors, and
a predetermined mapping between the thresholds and candidate values of the MCS reception margin parameter.

6. The apparatus according to claim 2, wherein:
the first MPDU includes a data portion and a frame check sequence (FCS) that is based at least partly on the data portion,
the decoded first MPDU includes a decoded data portion and a decoded FCS based at least partly on the decoded data portion,
the processing circuitry is further configured to:
determine an integrity check of the decoded first MPDU based at least partly on the decoded data portion and the decoded FCS; and
determine the MCS reception margin parameter further based at least partly on the integrity check of the decoded first MPDU.

7. The apparatus according to claim 6, the processing circuitry further configured to:
set the MCS reception margin parameter to a first value when the number of detected bit errors is below the threshold;
set the MCS reception margin parameter to a second value when the number of detected bit errors is above the threshold and when the integrity check indicates a successful decoding of the first MPDU; and
set the MCS reception margin parameter to a third value when the number of detected bit errors is above the threshold and when the integrity check indicates an unsuccessful decoding of the first MPDU.

8. The apparatus according to claim 7, wherein:
the first value of the MCS reception margin parameter indicates a recommendation for the rate adaptation that the second MCS is to be lower than the first MCS,
the second value of the MCS reception margin parameter indicates a recommendation for the rate adaptation that the second MCS is to be unchanged with respect to the first MCS,
the third value of the MCS reception margin parameter indicates a recommendation for the rate adaptation that the second MCS is to be higher than the first MCS.

9. The apparatus according to claim 2, wherein:
the first and second MCSs are based on modulation types and forward error correction (FEC) coding rates,
the first MPDU is received in a downlink signal received from the AP,
the downlink signal is based on multiple modulation symbols encoded by a bit-to-symbol mapping of FEC output bits in accordance with a first modulation type of the first MCS, and
the FEC output bits are based on information bits encoded by an FEC encode algorithm in accordance with a first coding rate of the first MCS.

10. The apparatus according to claim 9, wherein:
the downlink signal is received in channel resources that include multiple sub-carriers of a predetermined sub-carrier bandwidth,
the downlink signal is an orthogonal frequency division multiplexing (OFDM) signal or an orthogonal frequency division multiple access (OFDMA) signal,
the modulation symbols of the downlink signal are mapped to the sub-carriers for the OFDM signal or OFDMA signal.

11. The apparatus according to claim 9, the processing circuitry further configured to:
generate, based on the modulation symbols of the downlink signal and in accordance with the first modulation type, decoded FEC output bits for input to an FEC decode algorithm; and
generate decoded information bits from the FEC decode algorithm,
wherein the number of bit errors of the first MPDU is based on a distance metric determined as part of the FEC decode algorithm.

12. The apparatus according to claim 9, the processing circuitry further configured to:
generate, based on the modulation symbols of the downlink signal and in accordance with the first modulation type, decoded FEC output bits for input to an FEC decode algorithm;

generate decoded information bits from the FEC decode algorithm; and
encode the decoded information bits in accordance with the FEC encode algorithm to generate re-encoded FEC output bits,
wherein the number of detected bit errors of the first MPDU is based on a comparison between the re-encoded FEC output bits and the decoded FEC output bits.

13. The apparatus according to claim 9, wherein:
the first and second MCSs are included in a candidate group of MCSs,
the MCSs of the candidate group are mapped to an ordered sequence of MCS indexes in accordance with a predetermined mapping,
the predetermined mapping is based on a non-decreasing relationship between the MCS indexes and ratios of information bits per modulation symbol of the MCSs, and
the ratios of information bits per modulation symbol of the MCSs are based on the modulation types and the forward error correction (FEC) coding rates.

14. The apparatus according to claim 2, wherein:
the first MPDU is included in an aggregation of multiple MPDUs included in a physical layer convergence procedure protocol data unit (PPDU) received from the AP,
the MPDUs of the PPDU are encoded in accordance with the first MCS,
the processing circuitry is further configured to:
  decode the multiple MPDUs of the PPDU;
  detect bit errors of the MPDUs of the PPDU based on comparisons between the received MPDUs of the PPDU and the decoded MPDUs of the PPDU; and
  determine, based on one or more comparisons between numbers of detected bit errors and the predetermined threshold, multiple MCS reception margin parameters for the multiple MPDUs of the PPDU or a joint MCS reception margin parameter for the multiple MPDUs of the PPDU,
wherein the BA frame includes the multiple MCS reception margin parameters or the joint MCS reception margin parameter.

15. The apparatus according to claim 2, wherein the processing circuitry includes a baseband processor to decode the MPDUs, to detect the bit errors of the first MPDU, to determine the MCS reception margin parameter, and to encode the BA frame.

16. The apparatus according to claim 2, wherein the apparatus further includes a transceiver to receive the MPDUs and to transmit the BA frame.

17. A non-transitory computer-readable storage medium that stores instructions for execution by one or more processors to perform operations for communication by a station (STA), the operations to configure the one or more processors to:
decode a trigger frame (TF) that indicates time resources and channel resources to be used during a transmission opportunity (TXOP) by the STA to receive a first medium access control protocol data unit (MPDU) and to transmit a block acknowledgement (BA) frame;
decode the first MPDU, wherein the first MPDU is encoded in accordance with a first modulation and coding scheme (MCS);
determine an acknowledgement bit that indicates whether the first MPDU is successfully decoded and determine an MCS reception margin parameter based at least partly on the acknowledgement bit;
encode, the BA frame for transmission, wherein the BA frame includes the MCS reception margin parameter and the acknowledgement bit; and
decode a second MPDU that is received during the TXOP and is encoded in accordance with a second MCS that is based at least partly on the MCS reception margin parameter.

18. The non-transitory computer-readable storage medium according to claim 17, wherein:
the first and second MPDUs are received from an access point (AP),
the TXOP is a time period obtained by the AP, and
the second MPDU is received during the TXOP subsequently to the first MPDU.

19. The non-transitory computer-readable storage medium according to claim 17, the operations to further configure the one or more processors to:
detect bit errors of the first MPDU based on a comparison between the received first MPDU and the decoded first MPDU; and
determine the MCS reception margin parameter further based at least partly on a comparison between a number of detected bit errors of the first MPDU and a predetermined threshold of bit errors.

20. A method of communication at a station (STA), the method comprising:
decoding a first medium access control protocol data unit (MPDU), the first MPDU encoded in accordance with a first modulation and coding scheme (MCS);
detecting bit errors of the first MPDU based on a comparison between the received first MPDU and the decoded first MPDU;
determining an MCS reception margin parameter based at least partly on a comparison between a number of detected bit errors of the first MPDU and a predetermined threshold of bit errors;
encoding, for transmission, a block acknowledgement (BA) frame that includes the MCS reception margin parameter and further includes an acknowledgement bit that indicates whether the first MPDU is successfully decoded; and
decoding a second MPDU that is encoded in accordance with a second, updated MCS that is based at least partly on the MCS reception margin parameter.

21. The method according to claim 20, further comprising:
decoding a trigger frame (TF) that indicates time resources and channel resources to be used during a transmission opportunity (TXOP) by the STA to receive the first MPDU and to transmit the BA frame,
wherein the TXOP is a time period obtained by an access point (AP), and
wherein the second MPDU is received during the TXOP subsequently to the first MPDU.

22. An apparatus of an access point (AP), the apparatus comprising: memory; and processing circuitry, configured to:
generate, in accordance with a first modulation and coding scheme (MCS) of a candidate group of MCSs, a first medium access control protocol data unit (MPDU) for transmission to a station (STA);
decode a block acknowledgement (BA) frame received from the STA, wherein the BA frame includes an MCS reception margin parameter that is based at least partly on a comparison between a predetermined threshold of bit errors and a number of bit errors detected, by the STA, in the first MPDU received at the STA; and determine, based at least partly on the MCS reception margin parameter, whether to switch from the first MCS to a second MCS of the candidate group to generate a second, subsequent MPDU for the STA.

23. The apparatus according to claim 22, the processing circuitry further configured to:
contend for a transmission opportunity (TXOP) in which the AP is to control access to channel resources;
encode, for transmission during the TXOP, a trigger frame (TF) that indicates first time resources of the TXOP to be used by the STA to receive the MPDU and second time resources of the TXOP to be used by the STA to transmit the BA frame; and
encode the second MPDU for transmission during the TXOP.

24. The apparatus according to claim 23, wherein:
the MPDU is based on a data portion and a frame check sequence (FCS) that is based at least partly on the data portion,
the MCS reception margin parameter is further based at least partly on an integrity check by the STA, in accordance with the FCS, that indicates whether the MPDU is decoded successfully at the STA,
the processing circuitry is further configured to:
when the MCS reception margin parameter indicates a first value in which the number of detected bit errors is below the threshold, select the second MCS as one of the MCSs of the candidate group that is higher than the first MCS;
when the MCS reception margin parameter indicates a second value in which the number of detected bit errors is above the threshold and the integrity check indicates a successful decoding of the MPDU, select the second MCS as the first MCS; and
when the MCS reception margin parameter indicates a third value in which the number of detected bit errors is above the threshold and the integrity check indicates an unsuccessful decoding of the MPDU, select the second MCS as one of the MCSs of the candidate group that is lower than the first MCS.

25. The apparatus according to claim 24, wherein:
the MCSs of the candidate group are mapped to an ordered sequence of MCS indexes in accordance with a predetermined mapping,
the predetermined mapping is based on a non-decreasing relationship between the MCS indexes and ratios of information bits per modulation symbol of the MCSs, and
the ratios of information bits per modulation symbol of the MCSs are based on the modulation types and the forward error correction (FEC) coding rates.

26. The apparatus according to claim 23, wherein:
the MPDU is transmitted as part of a downlink signal in channel resources that include multiple sub-carriers of a predetermined sub-carrier bandwidth,
the downlink signal is an orthogonal frequency division multiplexing (OFDM) signal or an orthogonal frequency division multiple access (OFDMA) signal, and
the modulation symbols of the downlink signal are mapped to the sub-carriers for the OFDM signal or OFDMA signal.

* * * * *